United States Patent
Mukasa et al.

(10) Patent No.: US 7,052,738 B2
(45) Date of Patent: May 30, 2006

(54) FIBROUS SOLID CARBON MANIFOLD ASSEMBLY AND METHOD FOR PRODUCING THE SAME

(75) Inventors: Koichi Mukasa, Sapporo (JP);
Teruyuki Tsunabuchi, Sapporo (JP);
Kazuhisa Sueoka, Sapporo (JP)

(73) Assignee: Hokkaido University, Sapporo (JP)

( * ) Notice: Subject to any disclaimer, the term of this patent is extended or adjusted under 35 U.S.C. 154(b) by 0 days.

(21) Appl. No.: 10/945,095

(22) Filed: Sep. 21, 2004

(65) Prior Publication Data

US 2005/0053721 A1     Mar. 10, 2005

Related U.S. Application Data (62) Division of application No. 10/614,989, filed on Jul. 9, 2003.

(30) Foreign Application Priority Data

Nov. 12, 2002   (JP)   ............................. 2002-328231

(51) Int. Cl.
*B05D 3/12*     (2006.01)
(52) U.S. Cl. ................... 427/301; 427/355; 427/372.2; 427/377
(58) Field of Classification Search ................ 427/301, 427/355, 372.2, 377
See application file for complete search history.

(56) References Cited

U.S. PATENT DOCUMENTS

| | | | | |
|---|---|---|---|---|
| 5,165,909 A | * | 11/1992 | Tennent et al. | ........... 423/447.3 |
| 5,726,116 A | * | 3/1998 | Moy et al. | ................ 423/447.3 |
| 5,780,101 A | * | 7/1998 | Nolan et al. | ................. 427/216 |
| 5,973,444 A | * | 10/1999 | Xu et al. | ..................... 313/309 |
| 6,045,769 A | * | 4/2000 | Kambe et al. | ........... 423/447.3 |
| 6,312,303 B1 | | 11/2001 | Yaniv et al. | |
| 6,333,016 B1 | * | 12/2001 | Resasco et al. | .......... 423/447.3 |
| 6,413,487 B1 | * | 7/2002 | Resasco et al. | .......... 423/447.3 |
| 6,495,258 B1 | | 12/2002 | Chen et al. | |
| 6,522,055 B1 | | 2/2003 | Uemura et al. | |
| 6,582,673 B1 | * | 6/2003 | Chow et al. | ............. 423/445 R |
| 6,730,284 B1 | | 5/2004 | Harutyunyan et al. | |

FOREIGN PATENT DOCUMENTS

| | | | |
|---|---|---|---|
| EP | 56004 | * | 1/1986 |
| WO | 01/98208 | * | 12/2001 |

OTHER PUBLICATIONS

Rodriguez et al "Catalytic Engineering of Carbon Nanostructures" Lngmuir, 1995, 3862-3866.*

* cited by examiner

*Primary Examiner*—Archene Turner
(74) *Attorney, Agent, or Firm*—Crowell & Moring LLP (57) ABSTRACT

A fibrous solid carbon manifold assembly and a method for producing the fibrous solid carbon manifold assembly are provided. The fibrous solid carbon manifold assembly has fibrous bodies carbonized, and a limitless number of superfine graphite filaments grown on surfaces of the carbonized fibrous bodies, in the inside of each of said fibrous bodies and in a gap between adjacent ones of said fibrous bodies. With such a configuration, the number of superfine graphite filaments can be increased more greatly.

7 Claims, 6 Drawing Sheets

FIBROUS SOLID CARBON MANIFOLD ASSEMBLY AND METHOD FOR PRODUCING THE SAME

BACKGROUND OF THE INVENTION

1. Field of the Invention

The present invention relates to a fibrous solid carbon manifold assembly which can be applied to a wide technical field such as field-emission electron sources (specifically, needles of electron guns), various gas adsorbing materials, electrode materials for batteries, superfine cushioning materials, superfine elastic materials, and so on, and a method for producing the fibrous solid carbon manifold assembly.

2. Description of the Related Art

A conventional needle of a field-emission electron gun or the like was provided as one piece. For this reason, the needle of the electron gun was obliged to be exchanged for a new one when the needle was damaged in use.

JP-A-2001-2290806 has proposed a material used as a field-emission electron source and including: a metallic substrate containing a metal such as iron as a main component serving as a core on which nanotube-like fiber of carbon will be produced; a large number of through-holes formed in the metallic substrate; and a film of carbon nanotube-like fiber formed on surfaces of the metal substrate and on circumferential walls of the through-holes. Methods for producing such carbon nanotube-like fiber have been proposed in JP-A-2000-203820, JP-A-2000-327317, JP-A-2001-48510, etc.

The aforementioned material having carbon nanotube-like fiber grown on surfaces of a metallic substrate has various excellent properties.

SUMMARY OF THE INVENTION

An object of the present invention is to provide a fibrous solid carbon manifold assembly in which the number of superfine graphite filaments such as carbon nanotube-like fiber filaments is increased more greatly, and a method for producing the fibrous solid carbon manifold assembly.

In order to achieve the above object, according to first means of the present invention, there is provided a fibrous solid carbon manifold assembly including: fibrous bodies carbonized; and a limitless number of superfine graphite filaments grown on surfaces of the fibrous bodies, in the inside of each of the fibrous bodies and in a gap between adjacent ones of the fibrous bodies.

According to second means of the present invention, there is provided a fibrous solid carbon manifold assembly including: fibrous bodies carbonized; a limitless number of superfine graphite filaments grown and carried on surfaces of the fibrous bodies, in the inside of each of the fibrous bodies and in a gap between adjacent ones of the fibrous bodies; and chaff charcoal powder or marine algae/bacteria containing a micro-crystal structure of cellulose, and carried on the surfaces of the fibrous bodies, in the inside of each of the fibrous bodies and in the gap between adjacent ones of the fibrous bodies.

According to third means of the present invention, there is provided a fibrous solid carbon manifold assembly defined in the first or second means, wherein the superfine graphite filaments are hollow filaments.

According to fourth means of the present invention, there is provided a method of producing a fibrous solid carbon manifold assembly, including the steps of: depositing fine particles of a catalyst on surfaces of fibrous bodies, in the inside of each of the fibrous bodies and in a gap between adjacent ones of the fibrous bodies, for example, by an impregnation method or an ion exchange method; and bringing the catalyst fine particle-deposited fibrous bodies into contact with a hydrocarbon gas such as a methane gas at a high temperature in an anaerobic condition to thereby carbonize the fibrous bodies and generate and grow a limitless number of superfine graphite filaments on the surfaces of the fibrous bodies, in the inside of each of the fibrous bodies and in the gap between adjacent ones of the fibrous bodies.

According to fifth means of the present invention, there is provided a method of producing a fibrous solid carbon manifold assembly, including the steps of: carbonizing fibrous bodies in another place or as a pre-treatment process in the same reaction furnace; depositing fine particles of a catalyst on surfaces of the carbonized fibrous bodies, in the inside of each of the fibrous bodies and in a gap between adjacent ones of the fibrous bodies; and bringing the catalyst fine particle-deposited fibrous bodies into contact with a hydrocarbon gas at a high temperature to thereby generate and grow a limitless number of superfine graphite filaments in the inside of each of the carbonized fibrous bodies and in the gap between adjacent ones of the fibrous bodies.

According to six means of the present invention, there is provided a method of producing a fibrous solid carbon manifold assembly defined in the fourth or fifth means, wherein: the catalyst is constituted by metallic fine particles such as nickel fine particles; and the step of bringing the catalyst fine particle-deposited fibrous bodies into contact with a hydrocarbon gas to generate and grow superfine graphite filaments is carried out while a magnetic field is applied to the fibrous bodies.

According to seventh means of the present invention, there is provided a method of producing a fibrous solid carbon manifold assembly defined in the fourth or fifth means, further including the step of removing (for example, polishing) the catalyst fine particles deposited on head portions of the graphite filaments.

According eighth means of the present invention, there is provided a method of producing a fibrous solid carbon manifold assembly defined in the fourth or fifth means, further including the steps of: forming a filament set layer by using a mixture of each of the grown graphite filament-containing fibrous bodies and a binder such as a high-molecular binder; and polishing a surface of the filament set layer to thereby reveal the graphite filaments.

According to ninth means of the present invention, there is provided a method of producing a fibrous solid carbon manifold assembly defined in the eighth means, wherein: the step of forming the filament set layer is carried out by applying or bonding the mixture of each of the fibrous bodies and the binder onto a support member such as a metal plate; and the method further includes the step of releasing the support member from the filament set layer after a surface of the filament set layer is polished.

According to tenth means of the present invention, there is provided a method of producing a fibrous solid carbon manifold assembly defined in the ninth means, wherein: the step of forming the filament set layer is carried out by forming a water-soluble adhesive layer such as a polyvinyl alcohol layer on the support member and applying or bonding the mixture of each of the fibrous bodies and the binder onto the water-soluble adhesive layer; and the step of releasing the support member from the filament set layer is carried out by dissolving the water-soluble adhesive layer in water.

DETAILED DESCRIPTION OF THE INVENTION

Figure 1:
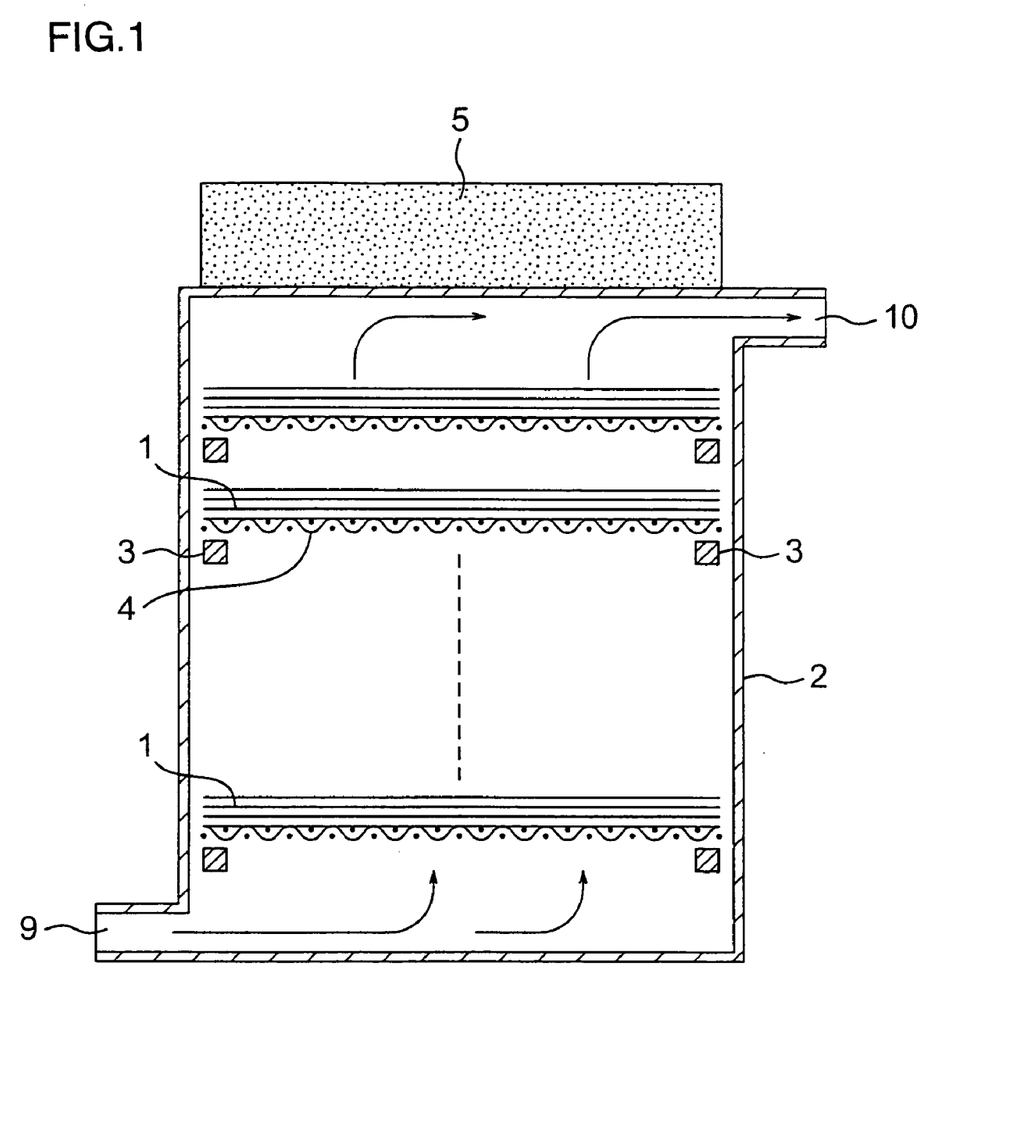
FIG. 1 is a sectional view of an apparatus for producing a fibrous solid carbon manifold assembly according to an embodiment of the invention.
Figure 2:
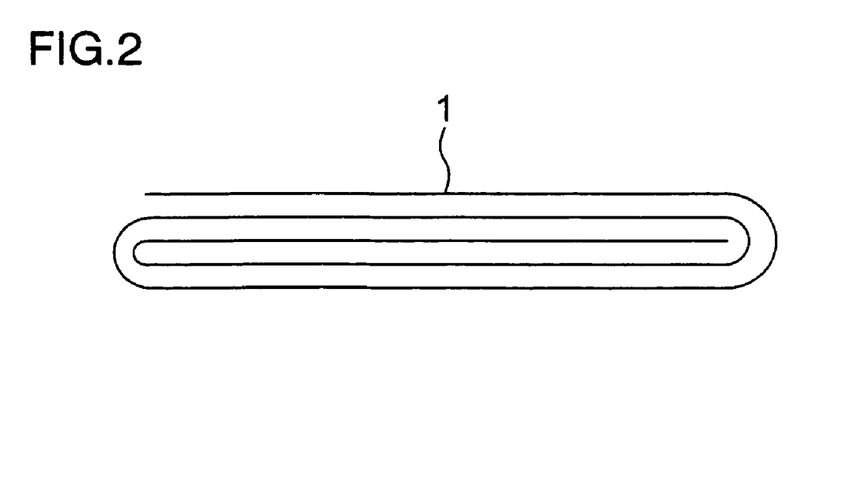
FIG. 2 is a view for explaining an example of the form of the fiber base material used in the invention.
Figure 3:
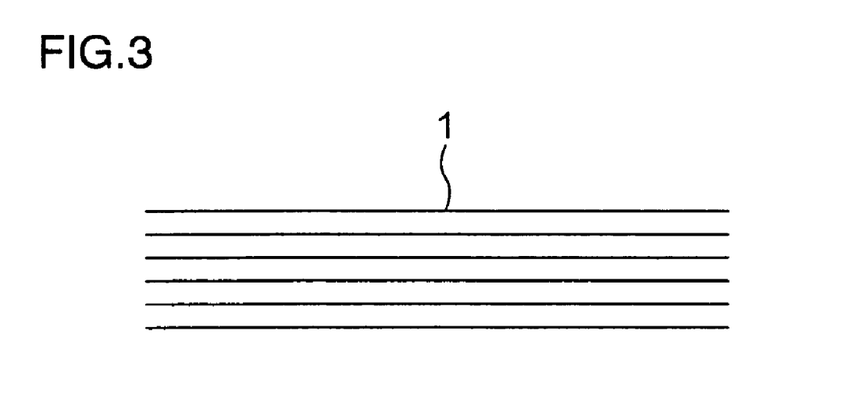
FIG. 3 is a view for explaining another example of the form of the fiber base material used in the invention.
Figure 4:
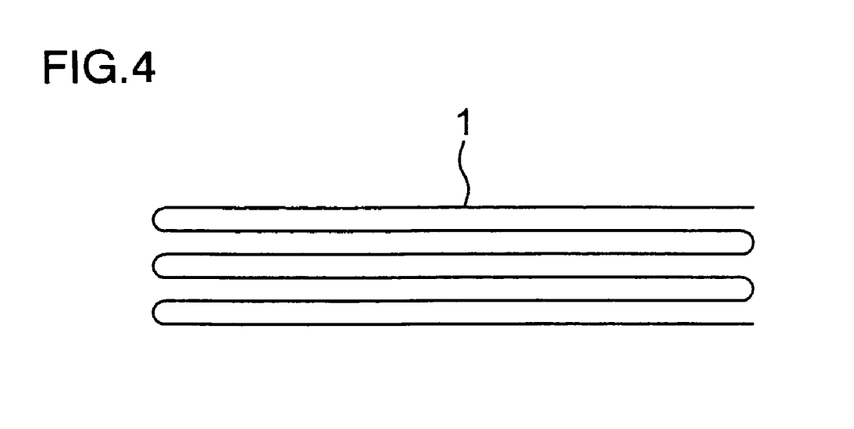
FIG. 4 is a view for explaining a further example of the form of the fiber base material used in the invention.
Figure 5:
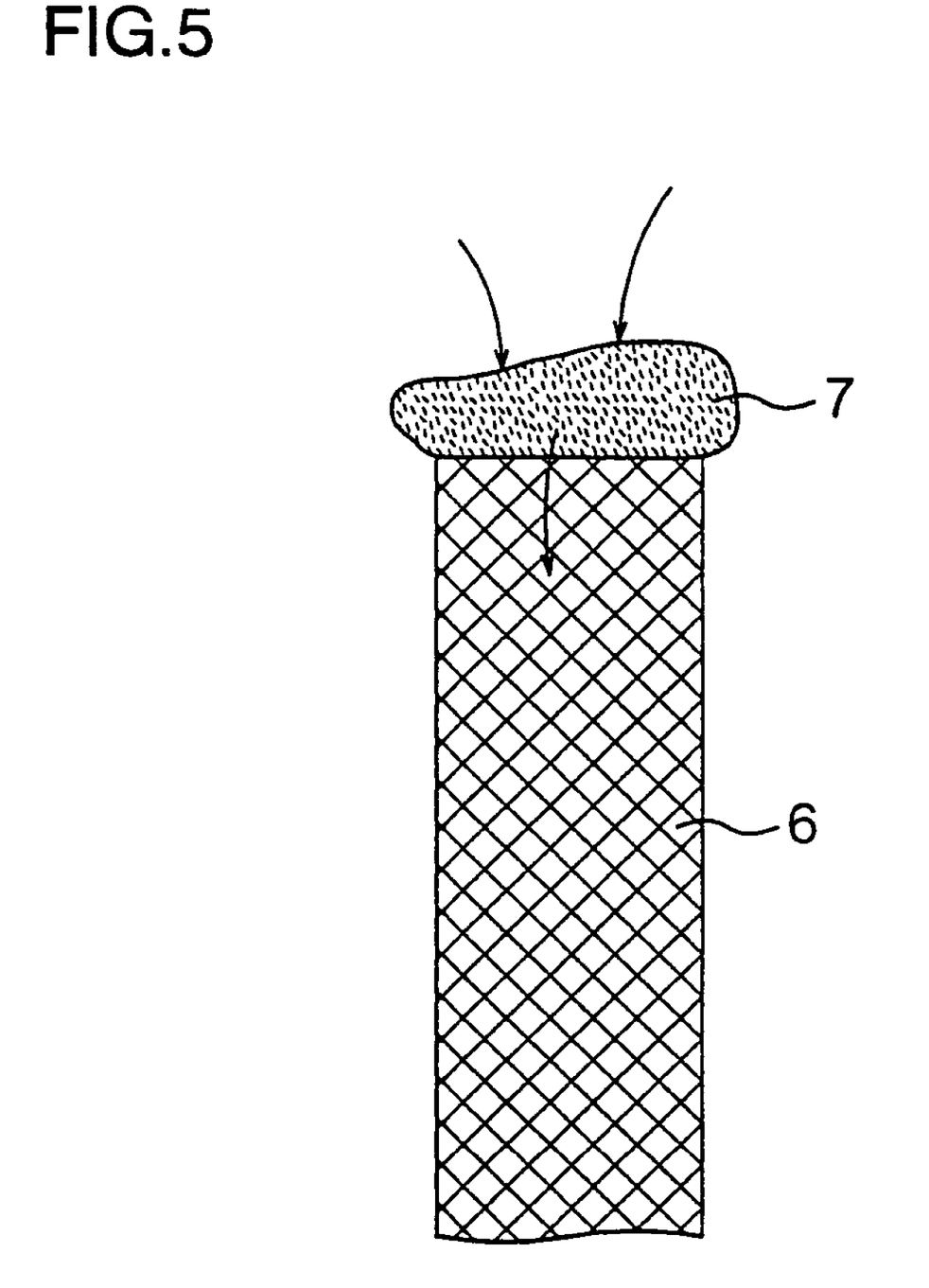
FIG. 5 is a typical view for explaining a process of growth of a graphite filament.
Figure 6:
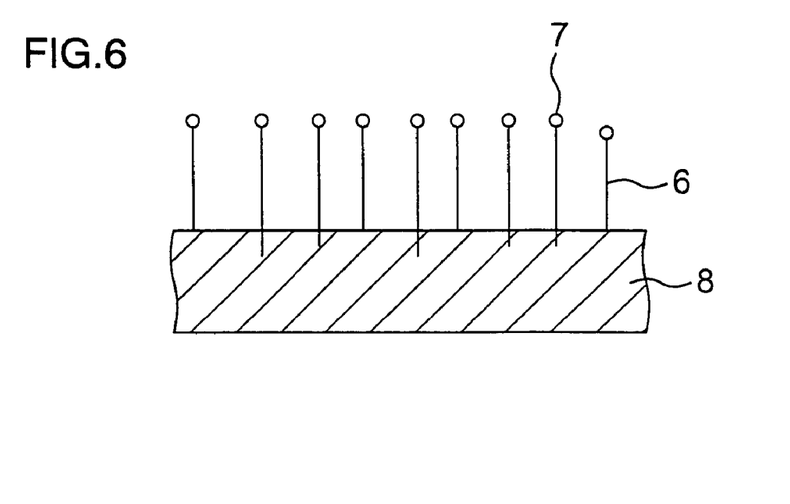
FIG. 6 is a typical view showing a state in which graphite filaments are grown on a surface of a fibrous body.
Figure 7:
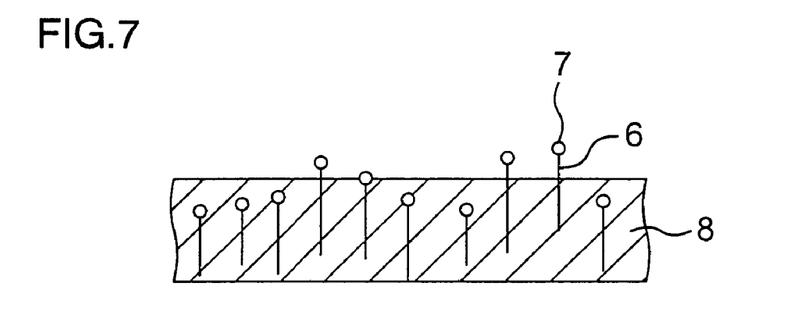
FIG. 7 is a typical view showing a state in which graphite filaments are grown in the inside of a fibrous body.
Figure 8:
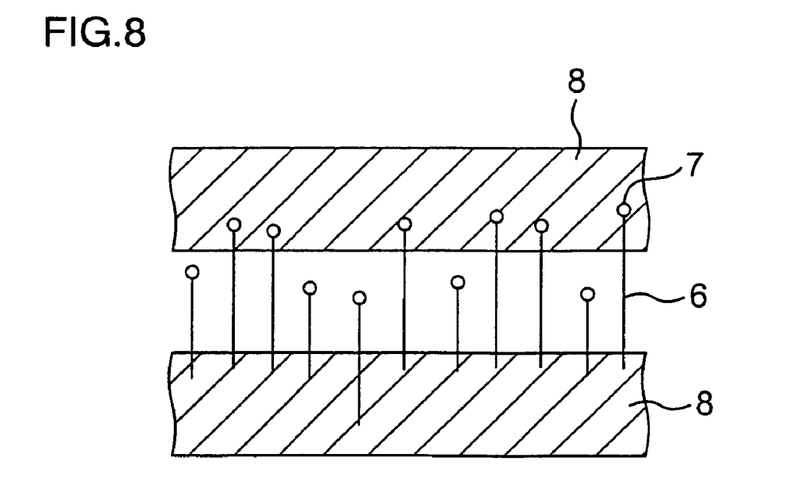
FIG. 8 is a typical view showing a state in which graphite filaments are grown in a gap between two fibrous bodies.
Figure 9:
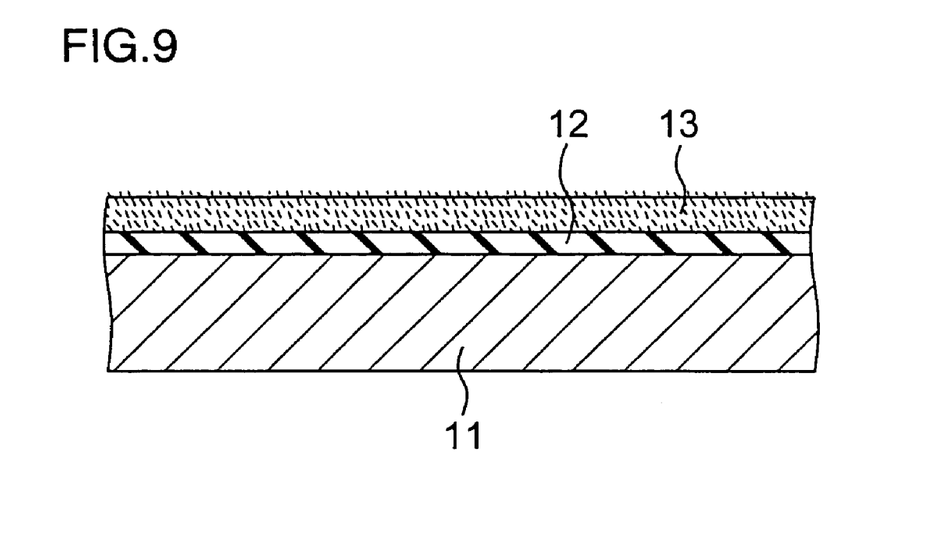
FIG. 9 is a sectional view of an intermediate product having a filament set layer formed therein.
Figure 10:
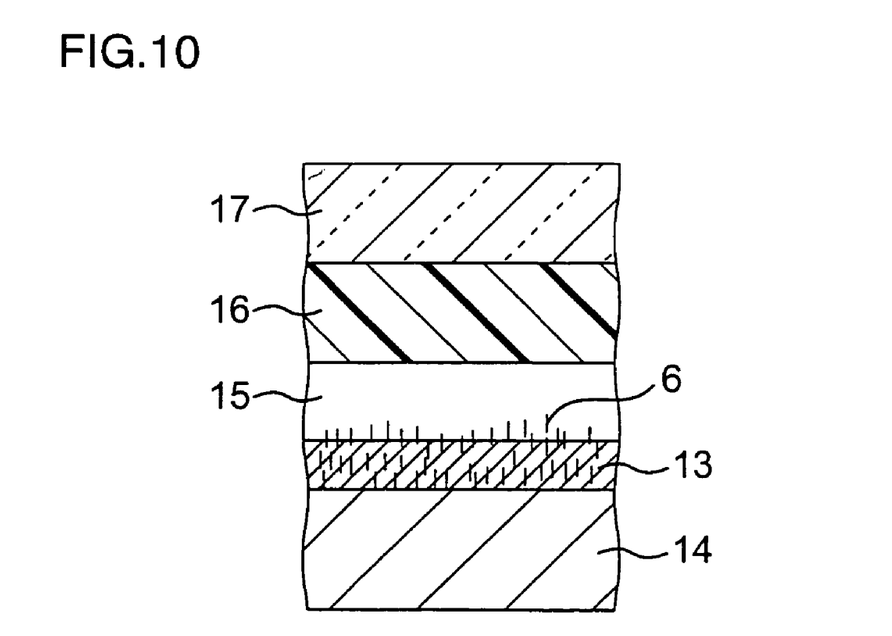
FIG. 10 is a sectional view of a display device formed by using the fibrous solid carbon manifold assembly.

An embodiment of the invention will be described below with reference to the drawings. FIG. 1 is a sectional view of an apparatus for producing a fibrous solid carbon manifold assembly according to an embodiment of the invention. FIGS. 2 to 4 are views for explaining the form of a fiber base material used in the invention. FIG. 5 is a typical view for explaining a process of growth of a graphite filament. FIG. 6 is a typical view showing a state in which graphite filaments are grown on a surface of a fibrous body. FIG. 7 is a typical view showing a state in which graphite filaments are grown in the inside of a fibrous body. FIG. 8 is a typical view showing a state in which graphite filaments are grown in a gap between two fibrous bodies. FIG. 9 is a sectional view of an intermediate product having a filament set layer formed therein. FIG. 10 is a sectional view of a display device formed by using the fibrous solid carbon manifold assembly.

A material prepared by winding a wide sheet spirally into a roll and pressing the roll vertically into a flat plate shape as a whole as shown in FIG. 2 may be used as the fiber base, material 1 which serves as a graphite filament carrier as will be described later. Or a material prepared by piling a large number of cut sheets having a predetermined width and pressing the pile vertically into a flat plate shape as a whole as shown in FIG. 3 may be used as the fiber base material 1. Or a material prepared by folding a wide sheet alternately and pressing the folded sheet vertically into a flat plate shape as a whole as shown in FIG. 4 may be used as the fiber base material 1.

The fiber base material 1 is made of fabric or nonwoven fabric of synthetic fiber, natural fiber or inorganic fiber, paper, felt, implanted matter, corrugated board matter, etc.

For example, polyamide, polyester, polyethylene terephthalate, acrylonitrile, polyvinyl alcohol, etc. can be used as the material of the synthetic fiber. For example, cotton, hemp, silk, wool, etc. can be used as the material of the natural fiber. For example, glass fiber, alumina fiber, silica-alumina fiber, carbon fiber, etc. can be used as the inorganic fiber.

The fiber base material 1 may be hybridized with marine algae, bacteria, etc. containing chaff charcoal powder of carbonized and pulverized chaff or cellulose microfibril (fine cellulose molecular crystal structure).

A catalyst which serves as a core on which graphite filaments will be produced is carried on a surface of the fiber base material 1 and in the inside of the fiber base material 1. Examples of the catalyst used include: a metal such as nickel, cobalt, iron, copper or molybdenum; an alloy of at least two selected from these metals (such as Ni—Co, Ni—Fe—Co, Ni—Mo or Fe—Ni—Mo); and a mixture of the metal or alloy and a precious metal such as platinum, rhodium or silver.

Specifically, for example, a mixture solution of lower alcohol and nickel acetate can be used. When the fiber base material 1 is immersed into this solution and dried, the fine particle-like catalytic metal is carried on the nearly whole surface of the fiber base material 1 and in the nearly whole inside of the fiber base material 1 by an impregnation method or an ion exchange method.

The fiber base material 1 with the catalyst is set in a reaction chamber 2 shown in FIG. 1. A plurality of stages each having a frame member 3 and a gas-permeable bearing member 4 placed on the frame member 3 and made of a metallic net, an expanded metal, or the like, are provided in the reaction chamber 2. The fiber base material 1 with the catalyst is placed on each of the stages.

A gas inlet 9 is provided at a lower portion of the reaction chamber 2. A gas outlet 10 is provided at an upper portion of the reaction chamber 2. Magnetic field generating means 5 made of a single or laminated magnet or the like is provided on the top of the reaction chamber 2. Magnetic field and magnetic flux are generated vertically in the reaction chamber 2 by the magnetic field generating means 5. The inside of the reaction chamber 2 is kept in a high-temperature state by a heater (not shown). The reaction temperature is preferably selected to be in a range of from 500° C. to 900° C., particularly not lower than 650° C.

Gas-like hydrocarbon or a mixture containing hydrocarbon is introduced into the reaction chamber 2 through the gas inlet 9. For example, chain hydrocarbon such as alkane, alkene or alkyne, alicyclic hydrocarbon or aromatic hydrocarbon can be used as the hydrocarbon. For example, natural gas or petroleum gas can be used as the hydrocarbon-containing mixture. As occasion demands, inert gas such as argon or nitrogen may be mixed with the hydrocarbon or the hydrocarbon-containing mixture.

When methane gas is used as the hydrocarbon, monocrystalline, polycrystalline or sooty graphite filaments having a multilayer structure of six-membered rings (graphene) are generated and grown by the following chemical reaction under the presence of the aforementioned catalyst. The chemical reaction serves as a reaction for directly discomposing methane and also as a reaction for producing by-product pure hydrogen simultaneously.

FIG. 5 is a view typically showing a state in which a graphite filament is generated and grown. First, the fine particle-like catalytic metal serves as a core on which a graphite filament will be produced. Carbon atoms are trapped in the catalyst 7 which gets into a substantially molten state because of the high temperature. Then, the carbon atoms are extruded into a tube shape from the catalyst 7 to start the production of a hollow graphite filament 6. When entrapment and extrusion of carbon atoms through the catalyst 7 is repeated in the aforementioned manner, the hollow graphite filament 6 grows gradually. Also when the graphite filament has another shape, the graphite filament can grow.

When a magnetic material such as Ni, Co, Fe, Ni—Co, Ni—Fe—Co, Ni—Mo or Fe—Ni—Mo as described above is used as the catalyst 7 in the condition that magnetic field is formed in a predetermined direction by the magnetic field generating means 5 as shown in FIG. 1, graphite filaments 6 grow in the predetermined direction (magnetic field direction) because of the influence of the magnetic field. Accordingly, the directions of growth of the graphite filaments 6 can be made uniform as well as the growth of the graphite filaments 6 can be accelerated.

Incidentally, it is generally said that there is a possibility that a metal may be demagnetized when the temperature of the metal reaches its Curie point (e.g., Fe: 800° C., Ni: 350° C.). A magnetic resonance phenomenon or the like however occurs because a substance vibrates finely atomistically. For this reason, it is conceived that each graphite filament 6 grows in a predetermined direction because the catalyst 7 made of metallic fine particles is influenced by the magnetic field under the aforementioned high-temperature condition.

Each graphite filament 6 can be grown substantially linearly or can be grown non-linearly into a coiled spring shape, a "U" shape, an "S" shape, a "W" shape, a "9" shape, a circular arc shape or the like, in accordance with the way of applying the magnetic field. A set of graphite filaments 6 each grown nonlinearly into a coiled spring shape or the like can be used as a micro cushioning or elastic material such as a micro spring because the graphite filament set has micro elasticity.

FIGS. 6 to 8 are views typically showing states in which the graphite filaments 6 are generated and grown. The fiber base material 1 used as a carrier for carrying the graphite filaments 6 has been already carbonized because of the high-temperature and oxygen-free condition in the reaction chamber 2. A limitless number of graphite filaments 6 are generated and grown on a surface of each of carbonized fibrous bodies 8 constituting the fiber base material 1 as shown in FIG. 6, in the inside of each of the fibrous bodies 8 as shown in FIG. 7 and in a gap between adjacent ones of the fibrous bodies 8 as shown in FIG. 8.

Although FIGS. 6 to 8 show graphite filaments 6 grown substantially linearly, the graphite filaments 6 may be constituted by a mixture of non-linearly grown graphite filaments 6 and linearly grown graphite filaments 6 or by non-linearly grown graphite filaments 6 as a main component in accordance with contrivance of the way of applying the magnetic field.

Although FIGS. 6 to 8 show the case where states of a surface of a fibrous body 8, an inside of a fibrous body 8 and a gap between two fibrous bodies 8 are drawn separately, a limitless number of graphite filaments 6 are actually grown in every place of one fiber base material 1 so that the states as shown in FIGS. 6 to 8 are mixed together.

Each graphite filament 6 has a length ranging from about 1 ìm to about 100 ìm and a thickness ranging from about 10 nm, inclusively, to about 1 ìm, exclusively.

Although this embodiment has shown the case where the fiber base material 1 is carbonized in the reaction chamber 2, the invention may be also applied to the case where the fiber base material 1 is carbonized at a high temperature in an anaerobic condition by another process or by a pretreatment process in the same reaction furnace before the fiber base material 1 is set in the reaction chamber 2.

After the first reaction, the same catalytic treatment as described above is applied to perform a second growth reaction. While grown in the lengthwise direction, the graphite filaments 6 are grown fat as a whole simultaneously. If such growth is required, the aforementioned catalytic treatment and the reaction for generating the graphite filaments 6 can be repeated so many times. The number of reactions depends on the final state of each of the graphite filaments 6. It is generally preferable that the number of reactions is 1 or 2.

Hydrogen gas produced by the reaction of generating the graphite filaments 6 is taken out through the gas outlet 10 shown in FIG. 1. To prevent explosion due to the hydrogen gas, an adequate amount of inert gas (such as Ar, $N_2$, etc.) may be mixed with the hydrocarbon gas supplied as a raw material in advance.

A method for producing needles of an electron gun for display device by using the fiber base material having a limitless number of graphite filaments grown and carried thereon in the aforementioned manner will be described below.

The fiber base material having the graphite filaments grown and carried thereon in the aforementioned manner is mechanically squashed and pulverized to form fine particles. A high-molecular material (such as an epoxy resin or an ultraviolet-setting resin) or a glass material used as a binder is immersed in or kneaded with the fine particles. A plate-like support member constituted by a metal plate, a ceramic plate, or the like, is used and the aforementioned kneaded mixture is expanded like a sheet on the support member and solidified so that a filament set layer endurable in the polishing step (which will be described later) is formed. On this occasion, a water-soluble adhesive agent such as polyvinyl alcohol (PVA) or carboxymethyl cellulose (CMC) is applied onto a surface of the support member and dried in advance so that the filament set layer is applied onto the water-soluble adhesive layer and dried.

FIG. 9 is a sectional view showing an intermediate product having the filament set layer formed thereon. As shown in FIG. 9, the filament set layer 13 having a predetermined thickness is formed on a support member 11 through a water-soluble adhesive layer 12.

In this example, a fiber base material having graphite filaments grown and carried thereon is pulverized in use. Alternatively, after a fiber base material having graphite filaments grown and carried thereon is mechanically squashed into a predetermined shape such as a plate shape, the inside and surface of the fiber base material may be impregnated or kneaded with a high-molecular material or a glass material as a binder and then the fiber base material may be fixed onto a surface of the support member.

The water-soluble adhesive layer 12 may be replaced by a double-sided pressure-sensitive adhesive tape.

Then, the surface of the filament set layer 13 is polished with a grindstone so that graphite filaments not covered with the binder are revealed on the surface. The limitless number of graphite filaments revealed in the aforementioned manner form needles of an electron gun. On this occasion, low accuracy of the order of tens of ìm will do for the surface roughness. This is because the thickness of a vacuum layer enough to receive tip portions of the needles of the electron gun (revealed graphite filaments) is about 100 ìm. The reason why the vacuum layer is made relatively thick in the aforementioned manner is that reduction in the cost of ceramic balls (e.g., glass hollow balls) interposed as spacers for forming the vacuum layer can be attained.

Although this embodiment has shown the case where the filament set layer 13 is polished with a grindstone, another means such as a dicing saw may be used. In addition, in order to polish the filament set layer 13, a superfine polishing method such as CMP (Chemical Mechanical Polishing) which is a polishing technique used in the semiconductor-related field may be used for performing high-precision processing to make the aforementioned vacuum layer thinner.

The filament set layer 13 needs to come into contact with an electrode. Therefore, the support member 11 of the intermediate product shown in FIG. 9 is released. Then, the rear surface of the filament set layer 13 is slightly polished so that the graphite filaments are revealed also on the rear surface. Because the support member 11 is integrated with the filament set layer 13 by the water-soluble adhesive layer 12 in the aforementioned manner, the support member 11 can be released easily when the water-soluble adhesive layer 12 is dissolved in water.

FIG. 10 is a sectional view of a display device using the electron gun. In FIG. 10, the reference numeral 14 designates an electrode patterned into a predetermined shape; and 13, a filament set layer placed on the electrode 14. A limitless number of graphite filaments 6 exposed on the front surface of the filament set layer 13 serve as needles of an electron gun. The graphite filaments 6 are brought into contact with each other or electrically connected to one another through the carbonized fibrous bodies 8.

The reference numeral 15 designates a vacuum layer; 16, a fluorescent substance layer; and 17, a glass layer. Ceramic balls (not shown) which serve as spacers are interposed between the filament set layer 13 and the fluorescent substance layer 16 to thereby secure the thickness of the vacuum layer 15.

Figure 11:
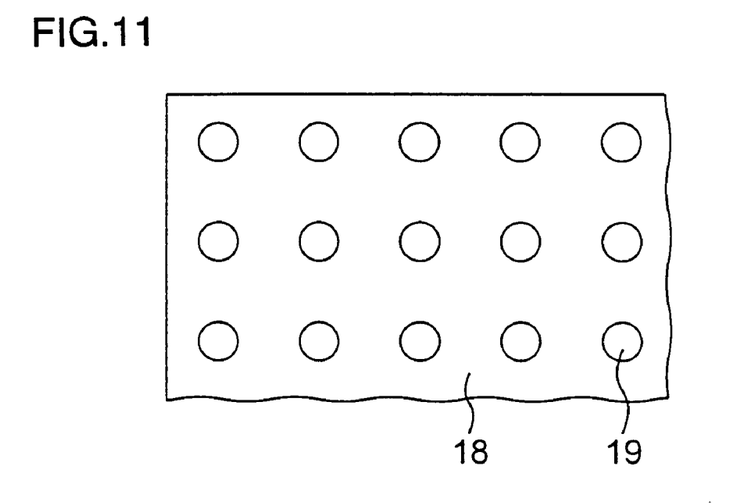
FIG. 11 is a top view of a substrate printed with catalytic ink according to another embodiment of the invention.
Figure 12:
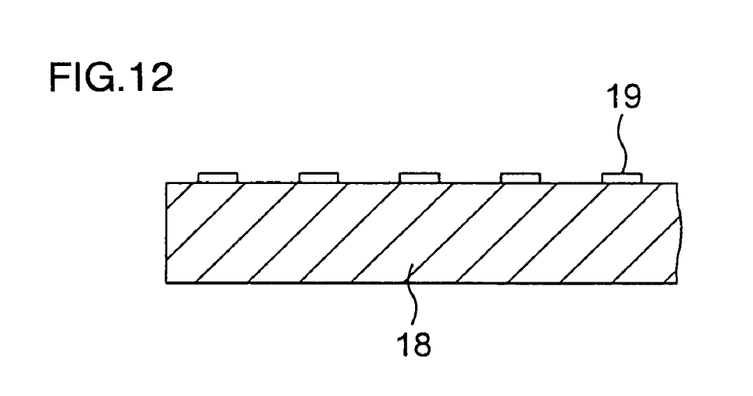
FIG. 12 is a sectional view of the substrate printed with the catalytic ink.
Figure 13:
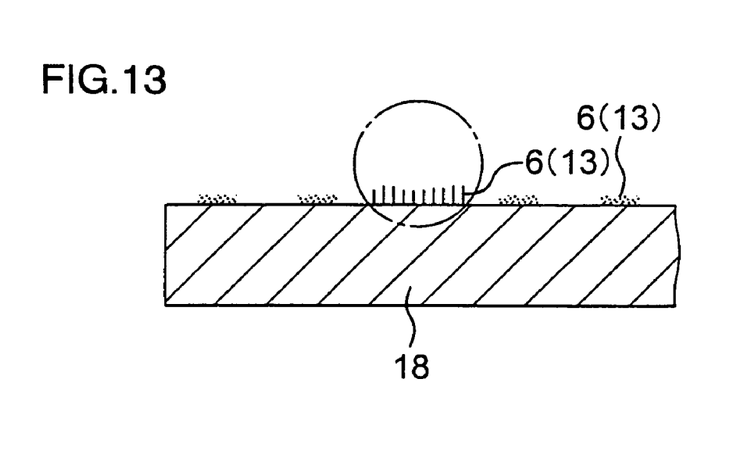
FIG. 13 is a sectional view showing a state in which graphite filaments are grown on the substrate.

FIGS. 11 to 13 are views showing another embodiment of the invention. In this embodiment, desired patterns or designs are drawn on a substrate 18 such as a ceramic substrate or a metal substrate with catalytic ink 19 by printing as shown in FIGS. 11 and 12. For example, the catalytic ink 19 is a solution composed of a solvent of organic liquid such as alcohol or/and water, and a compound containing a catalytic component such as nickel acetate and dissolved in the solvent. The catalytic content of the solution is preferably in a range of from about 5% by weight to about 30% by weight.

The substrate 18 on which the catalytic ink 19 is deposited is placed on a bearing member 4 shown in FIG. 1 and brought into contact with hydrocarbon gas in a high-temperature condition to grow graphite filaments 6 on the substrate 18 to thereby form a filament set layer 13 as shown in FIG. 13. The grown graphite filaments 6 are influenced by the magnetic field formed by the magnetic field generating means 5 so that the direction of growth thereof is substantially uniform. The planar shape of the formed filament set layer 13 is the same as that of the printed pattern of the catalytic ink 19.

Although this embodiment has shown the case where a fiber base material having graphite filaments grown and carried thereon is pulverized into fine particles so that a mixture of the fine particles and a binder is molded, the invention may be also applied to the case where the aforementioned fiber base material having graphite filaments grown and carried thereon is used directly without pulverization in accordance with use purpose.

The fibrous solid carbon manifold assembly according to the invention can be applied not only to the field-emission electron source but also to various industrial fields, for example, materials for adsorbing/occluding various kinds of gases such as hydrogen gas, deodorants, filters, electrodes for batteries such as fuel batteries or solar cells, electromagnetic absorbing (or shielding) materials, probes, micro cushioning materials, micro elastic materials, etc.

As described above, in accordance with the invention, a limitless number of superfine graphite filaments are grown on surfaces of fibrous bodies, in the inside of each of the fibrous bodies and in a gap between adjacent ones of the fibrous bodies. The fibrous bodies can carry catalytic fine particles in every place such as the surfaces of the fibrous bodies, the inside of each of the fibrous bodies and the gap between adjacent ones of the fibrous bodies. Accordingly, the number of graphite filaments can be increased limitlessly.

With the increase in the number of graphite filaments in the aforementioned manner, functional improvement of the graphite filaments, e.g., uniform emission of field electrons, increase in the quantity of adsorbed/occluded gas and improvement of the electromagnetic absorbing (or shielding) function, or achievement of a micro cushioning material or a micro elastic material can be attained.

In addition, when a magnetic field is applied, the shape of each of the graphite filaments can be controlled to any shape such as a linear shape or a non-linear shape.

What is claimed is:

1. A method of producing a fibrous solid carbon manifold assembly, comprising:
   depositing fine particles of a catalyst on surfaces of fibrous bodies, in the inside of each of said fibrous bodies and in a gap between adjacent ones of said fibrous bodies; and
   bringing the catalyst fine particle-deposited fibrous bodies into contact with a hydrocarbon gas at a high temperature under anaerobic conditions to thereby carbonize said fibrous bodies and generate and grow a limitless number of superfine graphite filaments on said surfaces of said fibrous bodies, in the inside of each of said fibrous bodies and in said gap between adjacent ones of said fibrous bodies.

2. A method of producing a fibrous solid carbon manifold assembly, comprising:
   carbonizing fibrous bodies;
   depositing fine particles of a catalyst on surfaces of said carbonized fibrous bodies, in the inside of each of said fibrous bodies and in a gap between adjacent ones of said fibrous bodies; and
   bringing the catalyst fine particle-deposited fibrous bodies into contact with a hydrocarbon gas at a high temperature to thereby generate and grow a limitless number of superfine graphite filaments in the inside of each of said carbonized fibrous bodies and in said gap between adjacent ones of said fibrous bodies.

3. A method of producing a fibrous solid carbon manifold assembly according to claim 1 or 2, wherein:
   said catalyst comprises metallic fine particles; and
   the step of bringing the catalyst fine particle-deposited fibrous bodies into contact with a hydrocarbon gas to generate and grow superfine graphite filaments is carried out while a magnetic field is applied to said fibrous bodies.

4. A method of producing a fibrous solid carbon manifold assembly according to claim 1 or 2, further comprising removing said catalyst fine particles deposited on head portions of said graphite filaments.

5. A method of producing a fibrous solid carbon manifold assembly according to claim 1 or 2, further comprising:
  forming a filament set layer by using a mixture of each of said grown graphite filament-containing fibrous bodies and a binder; and
  polishing a surface of said filament set layer to thereby reveal said graphite filaments.

6. A method of producing a fibrous solid carbon manifold assembly according to claim 5, wherein:
  said step of forming said filament set layer is carried out by applying or bonding said mixture of each of said fibrous bodies and said binder onto a support member; and
  said method further comprises releasing said support member from said filament set layer after a surface of said filament set layer is polished.

7. A method of producing a fibrous solid carbon manifold assembly according to claim 6, wherein:
  said step of forming said filament set layer is carried out by forming a water-soluble adhesive layer on said support member and applying or bonding said mixture of each of said fibrous bodies and said binder onto said water-soluble adhesive layer; and
  said step of releasing said support member from said filament set layer is carried out by dissolving said water-soluble adhesive layer in water.

* * * * *